(12) United States Patent
Murao et al.

(10) Patent No.: US 9,228,637 B2
(45) Date of Patent: Jan. 5, 2016

(54) POWER UNIT OF SHAFT DRIVE TYPE VEHICLE

(71) Applicant: HONDA MOTOR CO., LTD., Minato-Ku, Tokyo (JP)

(72) Inventors: Masaya Murao, Saitama (JP); Koji Terada, Saitama (JP); Junya Watanabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 487 days.

(21) Appl. No.: 13/833,803

(22) Filed: Mar. 15, 2013

(65) Prior Publication Data
US 2013/0255417 A1    Oct. 3, 2013

(30) Foreign Application Priority Data

Mar. 28, 2012 (JP) .................................. 2012-073963

(51) Int. Cl.
    *F16H 1/12*      (2006.01)
    *F16F 7/06*      (2006.01)
    *B62M 17/00*      (2006.01)

(52) U.S. Cl.
    CPC ............. *F16H 1/12* (2013.01); *B62M 17/00* (2013.01); *F16F 7/06* (2013.01); *Y10T 74/19693* (2015.01)

(58) Field of Classification Search
    CPC ...... F16F 7/06; Y10T 74/19693; B62M 17/00
    See application file for complete search history.

(56) References Cited

U.S. PATENT DOCUMENTS

| | | | | |
|---|---|---|---|---|
| 3,997,043 A * | 12/1976 | Kondo | ................... | B62M 11/00 192/55.1 |
| 4,719,984 A * | 1/1988 | Watanabe | ............... | B60T 1/062 180/215 |
| 5,549,286 A * | 8/1996 | Vacca | ....................... | B60S 1/16 15/250.3 |
| 6,427,796 B1 * | 8/2002 | Tsutsumikoshi | ...... | B62K 11/10 180/226 |
| 8,316,738 B2 * | 11/2012 | Hellinger | ........... | B60K 17/3462 180/247 |
| 8,556,019 B2 * | 10/2013 | Kuroki | ..................... | B60K 6/48 180/220 |

FOREIGN PATENT DOCUMENTS

JP          4795182 B2    10/2011

* cited by examiner

*Primary Examiner* — David M Fenstermacher
(74) *Attorney, Agent, or Firm* — Carrier Blackman & Associates, P.C.; Joseph P. Carrier; William D. Blackman

(57) ABSTRACT

A power unit includes a cam damper mechanism having a cam member reciprocally and unrotatably provided on one of a pair of bevel gears, and rotatably provided on an extended shaft; a lifter member slidably and unrotatably provided on the extended shaft in an axial direction; a damper spring configured such that one end portion thereof is supported on a first flange portion of the extended shaft, and the other end portion thereof biases the lifter member toward the cam member in an axial direction by abutting on the lifter member, and the biasing force is supported by the one bevel gear. The extended shaft has the one of the bevel gears and the cam damper mechanism between the first flange portion and a first bearing, and is accommodated in the bevel gear case so as to be fixed to a bevel gear holder along with the first bearing.

20 Claims, 5 Drawing Sheets

POWER UNIT OF SHAFT DRIVE TYPE VEHICLE

CROSS-REFERENCE TO RELATED APPLICATIONS

The present invention claims priority under 35 USC 119 based on Japanese patent application No. 2012-073963, filed on Mar. 28, 2012. The entire subject matter of this priority document, including specification claims and drawings thereof, is incorporated by reference herein.

BACKGROUND OF THE INVENTION

1. Field of the Invention

The present invention relates to a power unit of a shaft drive type vehicle. More particularly, the present invention relates to a power unit for shaft drive type vehicle in which an extended shaft, which is provided on a shaft end portion of an output shaft of the power unit, has a cam damper mechanism and a pair of bevel gears connecting a drive shaft system.

2. Description of the Background Art

There is a known power unit of a shaft drive type motorcycle, in which a countershaft of a transmission constitutes an output shaft, an extended shaft is coaxially provided on a shaft end portion of the output shaft protruding to the outer side from a crankcase, and the extended shaft has a cam damper mechanism and a pair of bevel gears connecting a drive shaft system. An example of such power unit is disclosed in the Japanese Patent Publication No. 4795182 (specifically in FIG. 2 thereof).

In the power unit structure, as shown in the Japanese Patent Publication No. 4795182, an outer end portion of the extended shaft is rotatably supported on a bevel gear via a bearing, and one of bevel gears, and the cam damper mechanism are mounted in series on the extended shaft.

When attaching the extended shaft, first, a cam face member on one side which constitutes the cam damper mechanism is fastened to a countershaft. Then, the outer end portion of the extended shaft is pierced and fastened to the bearing set on the bevel gear cover so as to sandwich one of the bevel gears. The bevel gear cover is fastened to the crankcase so as to be abutted thereon in such a state that a cam member on the other side, which constitutes the cam damper mechanism, and a damper spring are mounted.

Consequently, the inside end portion of the extended shaft is coaxially and reciprocally rotatably connected to the output shaft via a needle bearing. The cam member is abutted on the cam face member (lifter member), which is fitted on the countershaft (output shaft) side, and the damper spring is in a specified preloading compressed state.

Therefore, according to the power unit structure as shown in the Japanese Patent Publication No. 4795182, a cam damper can be provided without increasing the number of axis of the power unit, which is advantageous in the reduction in cost and weight. However, the damper spring is preloaded after the bevel gear cover is attached to the crankcase, and it is necessary to provide a shim between a bevel gear case and the bearing, or between the bearing and the bevel gear, one of the bevel gears, in order to put a pair of bevel gears in a specified meshing state. As a result, since both the shim and the damper spring are fastened and compressed together, there is a difficulty in confirming the preload of the damper spring and is a problem of the change in preload according to the thickness of shim.

In consideration of the above-described circumstances, it is one of the object of the present invention to provide a power unit of shaft drive type vehicle capable both of keeping the uniform preloading of a damper spring and facilitating the adjustment of the mesh amount of bevel gears, in a power unit which has a cam damper mechanism and a pair of bevel gears connecting the drive shaft system on the extended shaft provided on a shaft end portion of the output shaft of the power unit.

SUMMARY OF THE INVENTION

In order to achieve the above objects, the present invention according to a first aspect thereof is characterized in that in a power unit of a shaft drive type vehicle in which a bevel gear case, which is provided on the power unit, accommodates an extended shaft, which is disposed on a shaft end portion of an output shaft protruding from a unit case of a power unit so as to integrally rotate therewith, and a pair of bevel gears, which convert the axial direction of the extended shaft, and the extended shaft has a cam damper mechanism including a cam member, a lifter member, which cooperates with the cam member, and a damper spring which pressure-welds the lifter member and the cam member, the cam member of the cam damper mechanism is reciprocally unrotatably provided on the bevel gear, one of the pair of bevel gears, and is rotatably provided on the extended shaft; the lifter member is provided on the extended shaft slidably in the axial direction and unrotatably; the damper spring is configured such that one end side thereof is supported on a first flange portion, which is projected on an output shaft side portion of the extended shaft, the other end side thereof biases the lifter member toward the cam member in the axial direction by abutting on the lifter member, and the biasing force applied on the cam member in the axial direction is supported by the bevel gear, at least one of the bevel gears; the extended shaft has the bevel gear, one of the bevel gears, and the cam damper mechanism between the first flange portion of the output shaft side portion and a first bearing which is fastened to the other end portion, and is configured so as to be accommodated in the bevel gear case in such a state that the extended shaft is fixed to a bevel gear holder along with the first bearing.

The present invention according to a second aspect thereof, in addition to the first aspect, is characterized in that in the power unit of the shaft drive type vehicle, a collar member formed separately from the extended shaft is fitted on the extended shaft; the collar member has a first cylindrical portion, on which the bevel gear (one of the bevel gears) is relatively rotatably supported, and a second flange portion extending outside in the diameter direction so as to be sandwiched between the bevel gear, one of the bevel gears, and the first bearing; the extended shaft is provided with a stepped portion on which the end portion of the first cylindrical portion of the collar member is abutted; the first bearing is fastened to the extended shaft by a fastening member with an inner race thereof sandwiched between a retainer plate member and the collar member.

The present invention according to a third aspect thereof, in addition to the second aspect, is characterized in that in the power unit of the shaft drive type vehicle, the side of the bevel gear (one of the bevel gears) and the cam member, which confronts the second flange portion of the collar member, is configured such that a portion thereof constitutes contact surfaces abutting on the second flange portion and the other portion thereof has gaps formed therebetween and the second flange portion.

The present invention according to a fourth aspect thereof, in addition to one of the second and third aspects, is characterized in that in the power unit of the shaft drive type vehicle, a second cylindrical portion, which extends after being fitted in the inner circumference of the inner race of the first bearing, is formed in the collar member.

The present invention according to a fifth aspect thereof, in addition to the fourth aspect, is characterized in that in the power unit of the shaft drive type vehicle, clearances are provided between the other end portion of the extended shaft, the end portion of the second cylindrical portion of the collar member and the retainer plate member.

The present invention according to a sixth aspect thereof, in addition to the first aspect, is characterized in that in the power unit of the shaft drive type vehicle, a hole portion, to which the first bearing is fixed, is provided in the bevel gear holder, and is provided with a projection portion, which protrudes in the inside diameter direction on the output shaft side of the hole portion, and a female screw portion which is disposed on the axial end side of the extended shaft of the hole portion; and the first bearing is seated on the projection portion and is fixed with a lock nut which is screwed in the female screw portion.

The present invention according to a seventh aspect thereof, in addition to the first aspect, is characterized in that in the power unit of the shaft drive type vehicle, the shaft end portion of the output shaft is pivotally supported via the second bearing after penetrating the unit case; the extended shaft is spline-connected with the output shaft; and the output shaft side portion of the extended shaft is disposed so as to be provided with a clearance therebetween and the second bearing.

The present invention according to an eighth aspect thereof, in addition to the seventh aspect, is characterized in that in the power unit of the shaft drive type vehicle, the second bearing is accommodated in a bearing holding boss of the unit case so as to be held thereby; the bearing holding boss has a protruding ring portion which protrudes on the extended shaft side; the third bearing is interposed between the protruding ring portion and the output shaft side portion of the extended shaft; there is provided a clearance in the axial direction between the first flange portion and the protruding ring portion.

The present invention according to a ninth aspect thereof, in addition to the seventh aspect, is characterized in that in the power unit of the shaft drive type vehicle, the output shaft is provided with an output shaft hollow portion; the lubricating oil passes inside the output shaft hollow portion; the extended shaft is also provided with an extended shaft hollow portion, which communicates with the output shaft hollow portion, and is configured such that the lubricating oil on the output shaft hollow portion side can circulate in the extended shaft hollow portion.

ADVANTAGEOUS EFFECTS OF THE INVENTION

According to the power unit of the shaft drive type vehicle of the first aspect of the present invention, the first flange portion is provided on the output shaft side portion of the extended shaft, and the cam damper mechanism is provided in a completed form on the extended shaft by fastening the first bearing to an other end portion of the extended shaft, which thereby can fix the compression amount of the damper spring only with the assembly on the extended shaft side.

By fixing the extended shaft, which is assembled in such manner, to the bevel gear holder together with the first bearing, when attaching the bevel gear holder to the bevel gear case, the adjustment of the mesh amount of a pair of bevel gears do not have an effect on the compression amount of the damper spring even when adjusting the shim at a joint face between the bevel gear holder and the bevel gear case.

Therefore, it is possible both to keep the uniform preloading of the damper spring and to facilitate the adjustment of the mesh amount of the bevel gears.

According to the second aspect of the present invention, in addition to the effect of the first aspect, it is possible to easily set the assembly of the second flange portion by separating the collar member, and to close the load for fastening the first bearing with the fastening member, the extended shaft, the stepped portion of the extended shaft, the first cylindrical portion of the collar member, the second flange portion of the collar member, the inner race of the first bearing and the retainer plate member in order, and to securely fasten the first bearing.

In addition, the cam member of the cam damper mechanism has the axial force, which is applied on the damper spring, is supported on the extended shaft via at least one of the bevel gears, the second flange portion of the collar member, the inner race of the first bearing, the retainer plate member and the fastening member, which thereby can fix the position in the axial direction of the cam member.

According to the third aspect of the present invention, in addition to the effect of the second aspect, by setting a part on the side, which confronts the second flange portion of the collar member, as the contact surfaces, the area of the contact surfaces is reduced and the lubricating oil is held in the gaps of the other part thereof, which thereby reduces the frictional resistance during a phase shifting rotation against the extended shaft of the cam member as a result of the operation of the cam damper mechanism.

According to the fourth aspect of the present invention, in addition to the effect of the one of the second and third aspects, the inside diameter of the first bearing becomes larger by that of the second cylindrical portion, which thereby can pivotally support the extended shaft with the capacious bearing without increasing the size of the ball or the roller of the bearing, and accordingly can suppress the device cost.

According to the fifth aspect of the present invention, in addition to the effect of the fourth aspect, it is possible to easily control the interference of the first bearing.

According to the sixth aspect of the present invention, in addition to the effect of the first aspect, it is possible to fix the first bearing inside the bevel gear holder with a simple configuration.

According to the seventh aspect of the present invention, in addition to the effect of the first aspect, the extended shaft can be rotatably provided integrally with the output shaft by being spline-connected with an output shaft, and is supported one-sidedly relative to the axial force on the bevel gear holder side via the first bearing. As a result, it is possible to prevent the extra axial force from applying on the cam damper mechanism which is disposed over the extended shaft.

According to the eighth aspect of the present invention, in addition to the effect of the seventh aspect, it is possible to pivotally and radially support the extended shaft more securely without applying the axial force on the extended shaft.

According to the ninth aspect of the present invention, in addition to the effect of the seventh aspect, it is possible to easily flow the lubricating oil around the cam damper mechanism and a pair of the bevel gears.

For a more complete understanding of the present invention, the reader is referred to the following detailed description section, which should be read in conjunction with the

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

In other words, in the description and scope of claims of the specification, directions such as front and rear, left and right, and upper and lower are formed with reference to the direction the vehicle body with the power unit of the shaft drive type vehicle installed in the shaft drive type vehicle according to an illustrative embodiment of the present invention.

With reference to FIGS. 1 to 5, a power unit of a shaft drive type vehicle according to the illustrative embodiment of the present invention will now be described.

In the embodiment of the present invention, the shaft drive type vehicle is a small vehicle (not shown), for example, a motorcycle.

It may be noted that, in the accompanying drawings, arrows FR, LH, RH, and UP stand for front side, left side, right side, upper side of the vehicle, respectively.

Figure 1:
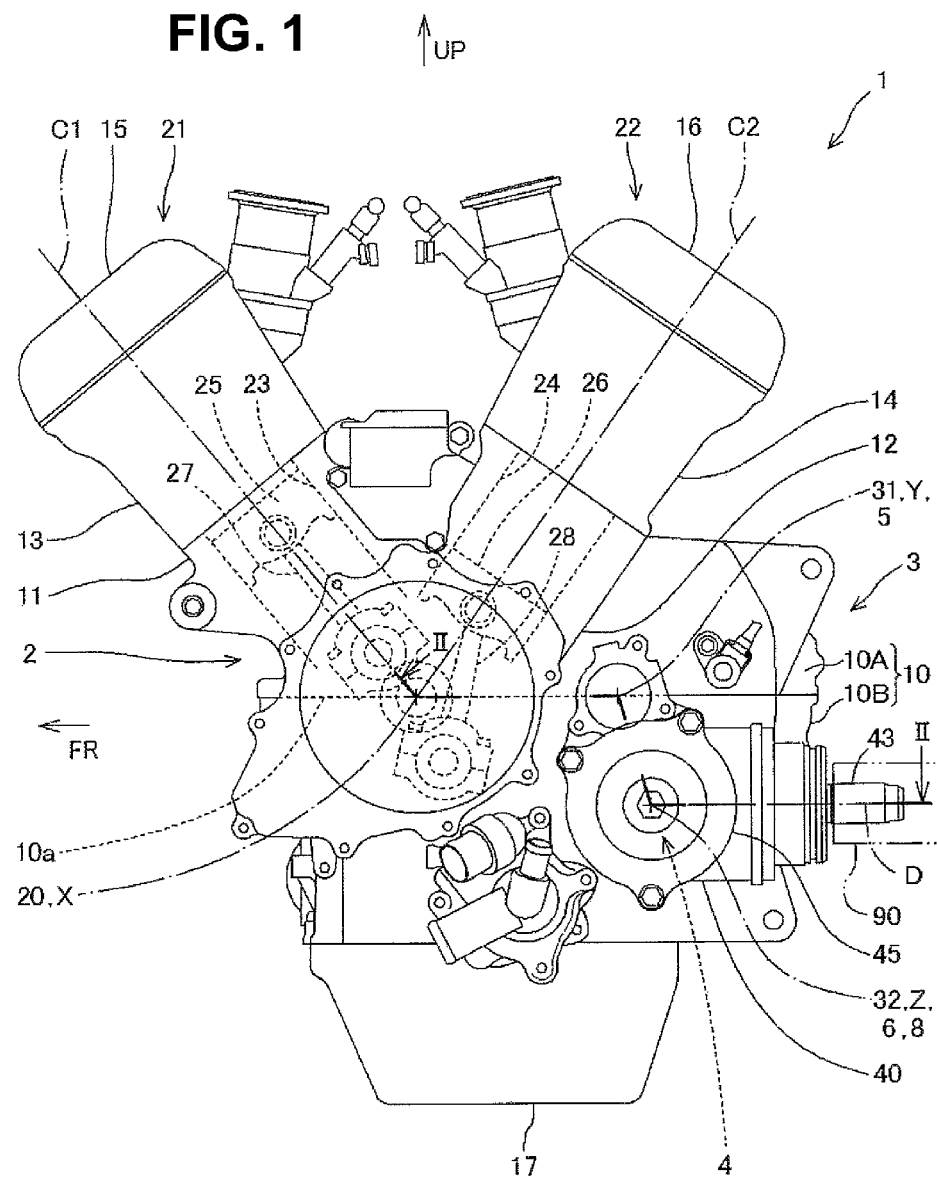
FIG. 1 is a left side view of an internal combustion engine of a shaft drive type vehicle according to an embodiment of the present invention.

FIGS. 1-5 relate to the illustrative embodiment of the present invention. FIG. 1 shows a power unit 1 of the embodiment of the present invention in such a state as to be installed in a shaft drive type vehicle (not shown).

The power unit 1 includes an internal combustion engine 2, which is arranged in a front portion of a unit case 10 as a crankcase, and a transmission device 3 which is arranged in a rear portion of the unit case 10.

The internal combustion engine 2 is a water-cooled four-stroke cycle V-type four-cylinder internal combustion engine. The four cylinders are arranged in two banks, front banks 21 and rear banks 22, which are open in a V shape in a front-and-rear direction. A crankshaft 20 (FIG. 2) of the internal combustion engine 2 is disposed such that an axis X thereof is perpendicular in the direction of travel of the vehicle and directed in a left-and-right direction of the vehicle.

The transmission device 3 is constructed as a gear transmission which is regular mesh type, and a main shaft 31 and a countershaft 32 of the transmission device 3 have axes Y, Z thereof respectively, parallel to the axis X of the crankshaft 20.

An extended shaft 6 is disposed on a shaft end portion 32b, which protrudes from the unit case 10, of the countershaft 32, which functions as an output shaft of the power unit 1, so as to coaxially and integrally rotate. The extended shaft 6 is equipped with an axial converting portion 4. The axial converting portion 4 includes a pair of bevel gears for converting the axial direction, that is, a drive bevel gear 41 and a driven bevel gear 42. A connecting shaft 43 is coaxially and integrally provided on the driven bevel gear 42.

Figure 2:
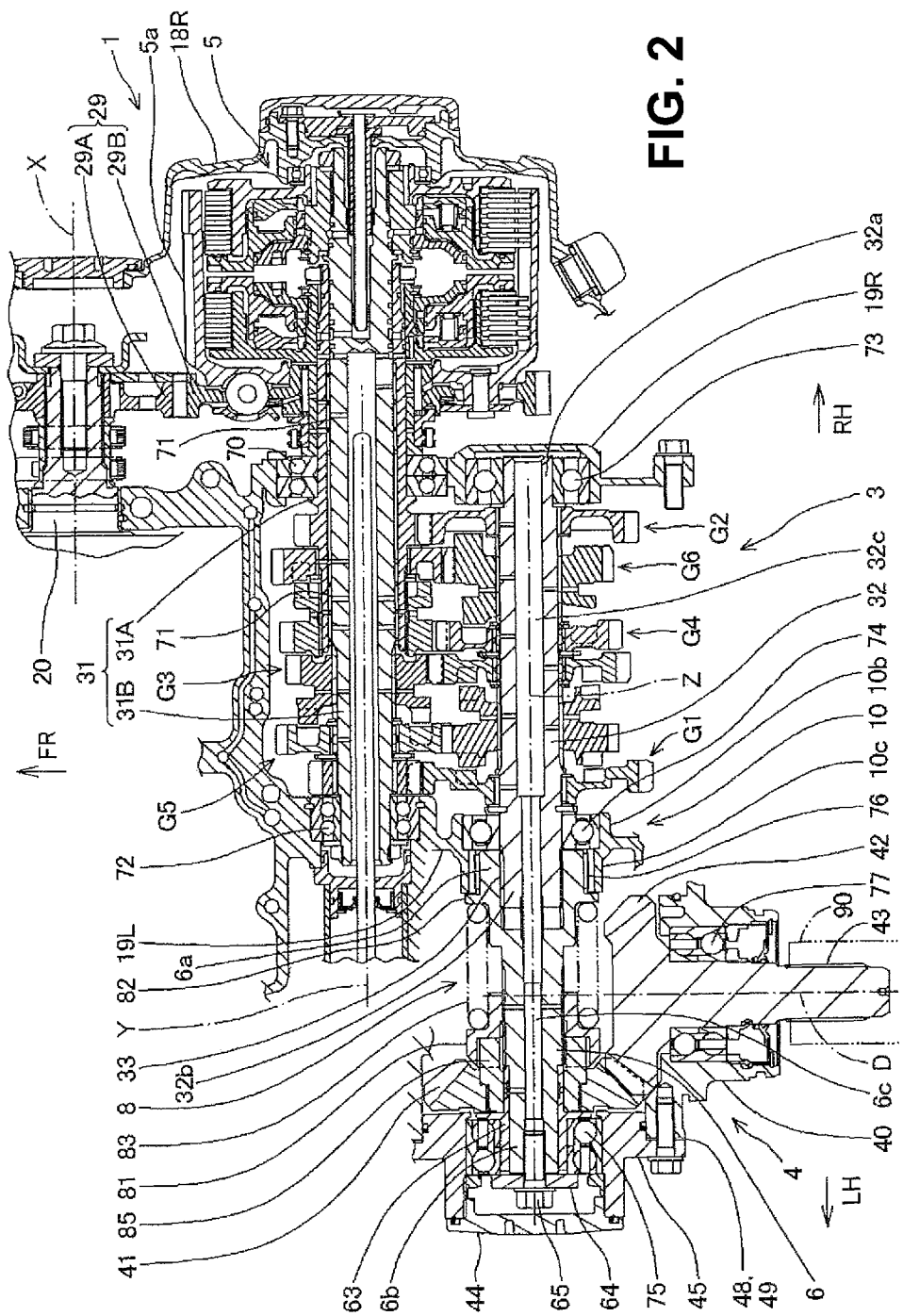
FIG. 2 is a sectional development view taken along lines shown by an arrow II-II in FIG. 1.
Figure 3:
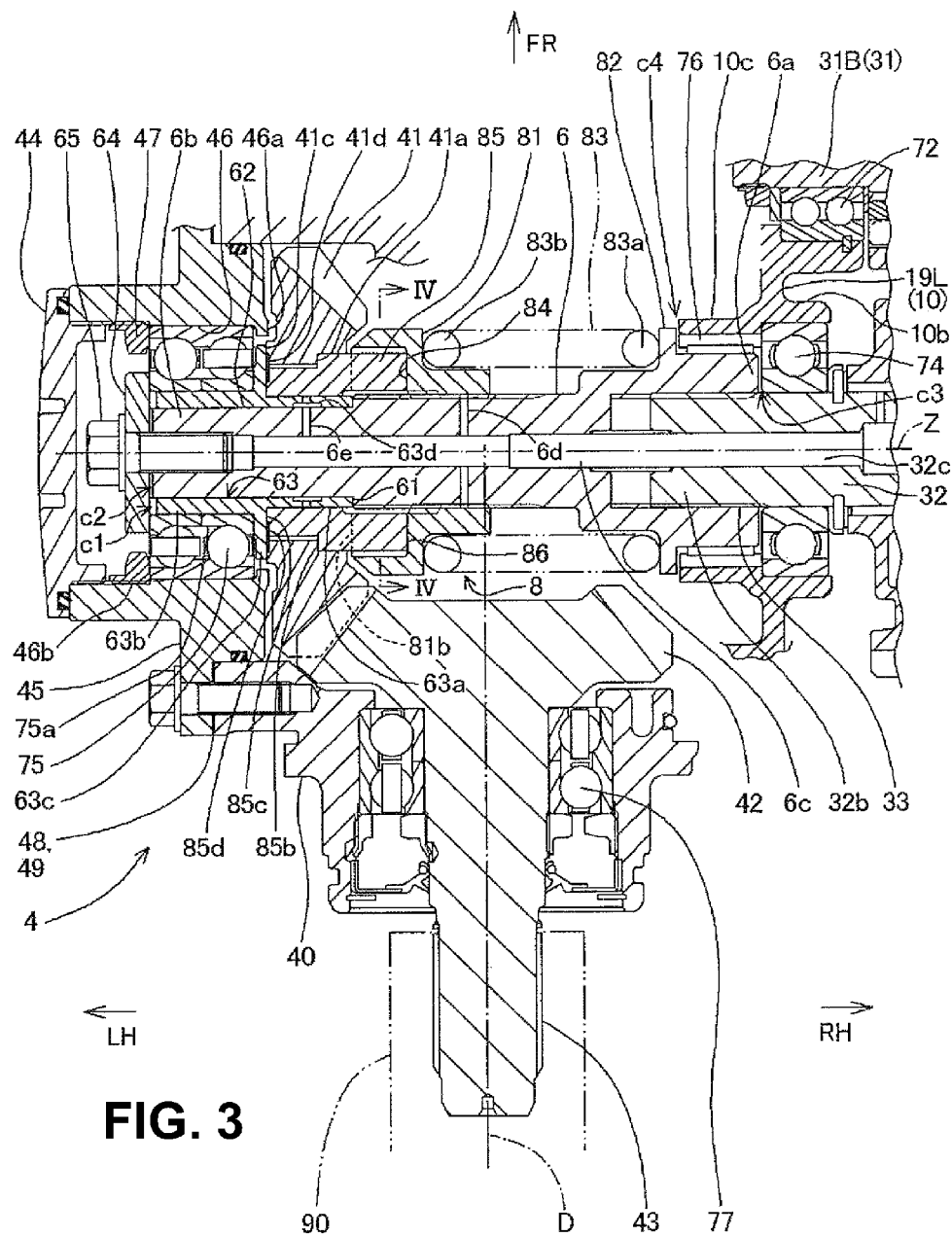
FIG. 3 is an enlarged view around an extended shaft in FIG. 2.

The connecting shaft 43 is perpendicular to the axis Z (the axis of the extended shaft 6) of the countershaft 32 in a bevel gear case 40 provided on the unit case 10. The connecting shaft 43 arranged in an axis D direction directed rearward is rotatably driven via a pair of the bevel gears 41, 42 by the extended shaft 6 (FIGS. 2 and 3). The connecting shaft 43 is connected with a drive shaft system 90. The drive shaft system 90 extends to the rear direction of the vehicle along a rear fork (not shown), and is operable to drive a rear wheel (not shown).

As shown in FIG. 1, the unit case 10 is formed in such a manner that an upper unit case 10A and a lower unit case 10B are connected. The front and rear banks 21, 22 are integrally formed on the upper unit case 10A such that cylinder axes C1, C2 for each cylinder are formed in a V shape, when viewed in a side view. The axis X of the crankshaft 20 is positioned at a mating surface 10a between the upper unit case 10A and the lower unit case 10B.

The front bank 21 includes a front cylinder block 11 which is integrally and continuously connected to the upper unit case 10A of the unit case 10, a front cylinder head 13 which is connected to the front cylinder block 11, and a front head cover 15 which is connected to the front cylinder head 13. The rear bank 22 includes a rear cylinder block 12 which is integrally and continuously connected to the upper unit case 10A of the crankcase 10, a rear cylinder head 14 which is connected to the rear cylinder block 12, and a rear head cover 16 which is connected to the rear cylinder head 14. An oil pan 17 is connected to the lower portion of the unit case 10.

Two cylinder bores 23 . . . which are aligned in the axis X direction of the crankshaft 20 are formed in the front cylinder block 11. Two cylinder bores 24 . . . which are aligned in the axis X direction of the crankshaft 20 are formed in the rear cylinder block 12. Both pistons 25 . . . , which are slidably fitted into both cylinder bores 23 . . . of the front bank 21 respectively, and pistons 26 . . . , which are slidably fitted into both cylinder bores 24 . . . of the rear bank 22 respectively, are continuously connected to the crankshaft 20 via connecting rods 27 . . . , 28 . . . , respectively.

Since the valve mechanism and the valve operation each for the banks 21, 22 are conventionally known, the drawing and explanation thereof will be omitted herein.

As shown in FIG. 2, the power transmission path, which lies between the crankshaft 20 and the rear wheel (not shown), includes in order from the crankshaft 20 side: a first reduction gear 29, a clutch device 5, the transmission device 3 constructed as a gear transmission, which is regular mesh type, a pair of the bevel gears 41, 42, the axial converting portion 4 which includes the connecting shaft 43 and is accommodated in the bevel gear case 40, and the drive shaft system 90 connected to the connecting shaft 43. The first reduction gear 29 and the clutch device 5 are accommodated in a right unit case cover 18R which is attached so as to cover the right side of the unit case 10. The transmission device 3 is accommodated in the unit case 10.

The unit case 10 includes a pair of left and right side walls 19L, 19R which face each other so as to be spaced apart in the axis X direction of the crankshaft 20.

The main shaft 31 of the transmission device 3 includes a first main shaft 31A and a second main shaft 31B, and the intermediate portion of the first main shaft 31A which is formed in a cylindrical shape with the axis Y parallel to the crankshaft 20 rotatably penetrates the right side wall 19R. Ball bearings 70 are interposed between the right side wall 19R and the first main shaft 31A.

The second main shaft 31B which has the axis Y parallel to the crankshaft 20 coaxially and relatively rotatably penetrates the first main shaft 31A while keeping a constant relative position relative to the first main shaft 31A in the axis Y direction. A plurality of needle bearings 71 . . . are interposed between the first main shaft 31A and the second main shaft 31B.

In addition, the left end portion of the second main shaft 31B is rotatably supported via ball bearings 72 on the left side wall 19L of the unit case 10.

The multiple disc friction clutch device 5 is provided on the right side portion of the main shaft 31, which protrudes to the right direction relative to the right side wall 19R of the unit case 10.

A clutch outer 5a of the clutch device 5 is supported via a shock absorbing member on a primary driven gear 29B which is pivotally and rotatably supported on the first main shaft 31A. The primary driven gear 29B constitutes the first reduction gear 29, in meshing engagement with a primary drive gear 29A which is fitted in the crankshaft 20.

The rotary power of the crankshaft 20 is transferred via the first reduction gear 29 to the clutch device 5. However, the clutch device 5 is configured such so as not to transfer the rotary power of the crankshaft 20 to the transmission device 3 to leave the vehicle in neutral while shifting the gears of the transmission device 3, and so as to transfer the rotary power of the crankshaft 20 to the main shaft 31 of the transmission device 3 soon after the shifting gears of the transmission device 3 stop.

The transmission device 3 is accommodated in the unit case 10, including the multiple transmission gear rows which can be alternatively established, for example, first to sixth gear trains G1, G2, G3, G4, G5, G6. The second, fourth, sixth gear trains G2, G4, G6 are provided between the first main shaft 31A and the countershaft 32, while the first, third, fifth gear trains G1, G3, G5 are provided between the second main shaft 31B, which coaxially and relatively rotatably penetrates the first main shaft 31A, and the countershaft 32.

A right end portion 32a of the countershaft (output shaft of the present invention) 32, which has the axis Z parallel to the crankshaft 20, is rotatably supported on the right side wall 19R via ball bearings 73. The left end portion (shaft end portion of the present invention) 32b of the countershaft 32, which interposes second ball bearings 74 (second bearings of the present invention) therebetween and the left side wall 19L, protrudes outside by rotatably penetrating the left side wall 19L to become the output shaft 32 of the internal combustion engine 2.

As shown in FIG. 3, a right end portion (output shaft side portion of the present invention) 6a of the extended shaft 6 is connected to the left end portion 32b of the countershaft 32 via a spline-connection portion 33, which protrudes to the left side from the left side wall 19L, so as to be coaxially and integrally rotate therewith. A left end portion (the other end portion of the present invention) 6b of the extended shaft 6 is pivotally and rotatably supported on a bevel gear holder 45, which is fastened to the bevel gear case 40 provided on the unit case 10, by first ball bearings 75 (first bearings of the present invention).

Incidentally, although in the embodiment of the present invention the bevel gear case 40 is configured with the shell formed integrally on the unit case 10, the bevel gear case may be configured with a shell which is firmly fastened to the unit case 10.

A cam damper mechanism 8, which includes a cam member 85, a lifter member 81 cooperating with the cam member 85, a damper spring 83 pressure-welding the lifter member 81 and the cam member 85, is provided over the extended shaft 6.

In other words, the annular lifter member 81 of the cam damper mechanism 8 is provided over the extended shaft 6 so as to be slidable in the axial direction and unrotatable by being spline-connected therewith. A first flange portion 82 is projected on the outer circumference of the right end portion 6a of the extended shaft 6. The damper spring 83 is interposed such that a right end side (one end side of the present invention) 83a is supported on the first flange portion 82, a left end side (the other end side of the present invention) 83b abuts on the lifter member 81, and the lifter member 81 is biased to the left in the axial direction.

A concave cam surface 84 which forms a concave portion in the axial direction along the circumferential direction is formed on a left side surface 81b of the lifter member 81, and a convex cam portion 86 of the cam member 85, which is attached on the left side over the extended shaft 6, abuts on the concave cam surface 84.

A stepped portion 61 is provided on the extended shaft 6 at the position in the vicinity of the left side surface 81b of the lifter member 81, the left side thereof is formed on a minor diameter portion 62, and a collar member 63 which is separated from the extended shaft 6 is fitted in the minor diameter portion 62.

The right end portion of a first cylindrical portion 63a which is the right side portion of the collar member 63, abuts on the stepped portion 61 of the extended shaft 6. The cam member 85 is pivotally, relatively rotatably and slidably supported in the axial direction on the first cylindrical portion 63a. The drive bevel gear 41 is relatively unrotatably attached to the outer circumference of the cam member 85 by spline fitting.

In other words, the first cylindrical portion 63a of the collar member 63 pivotally and relatively rotatably supports the drive bevel gear 41 via the cam member 85.

In addition, the left side portion of the collar member 63 forms a second cylindrical portion 63b which extends after being fitted in the inner circumferential surface of an inner race 75a of the first ball bearing 75, further the portion between the first cylindrical portion 63a and the second cylindrical portion 63b forms a second flange portion 63c which extends to the outside direction in the diameter direction so as to be sandwiched between the drive bevel gear 41 and the first ball bearing 75.

Accordingly, since the second cylindrical portion 63b extends after fitting in the inner circumferential surface of the inner race 75a of the first ball bearing 75, the inside diameter of the first ball bearing 75 becomes larger by that of the second cylindrical portion 63b. It is possible to pivotally support the extended shaft 6 with the capacious bearing without increasing the size of the ball or roller of the bearing, which thereby can suppress the device cost.

A retainer plate member 64 abuts on the left side surface of the inner race 75a of the first ball bearing 75, and the retainer plate member 64 is fastened to the left end portion 6b of the extended shaft 6 with a fastening bolt (fastening member of the present invention) 65.

At this time, the left end portion of the second cylindrical portion 63b of the collar member 63 and the left end portion 6b of the extended shaft 6 are set to have clearances c1, c2 therebetween and the retainer plate member 64, respectively.

Therefore, the first ball bearings 75 are fastened with fastening bolt 65 so as to be sandwiched by the retainer plate member 64 and the second flange portion 63c of the collar member 63. Since it is possible to close the load for fastening the first ball bearings 75 with the fastening bolt 65, the extended shaft 6, the stepped portion 61 of the extended shaft 6, the first cylindrical portion 63a of the collar member 63, the second flange portion 63c, the inner race 75a of the first ball bearing 75 and the retainer plate member 64 in order, the first ball bearings 75 can be securely fastened. Further, it is possible to easily control the interference of the first ball bearings 75 by clearances c1, c2 between the left end portion of the second cylindrical portion 63b, the left end portion of the extended shaft 6 and the retainer plate member 64.

The drive bevel gear 41 is relatively unrotatably attached on the outer circumference of the cam member 85 by being spline-fitted therewith. A stepped portion 85b which is directed to the left direction is provided on the outer circumference portion of cam member 85, abuts on the stepped portion 41a, which is provided on the inner circumference portion of the drive bevel gear 41 so as to be directed to right direction, in the axial direction. The drive bevel gear 41 supports the cam member 85, which is pushed to the left direction by the lifter member 81 biased to the left direction by the damper spring 83, in the axial direction. Further, the drive bevel gear 41 is supported by the second flange portion 63c of the collar member 63.

Therefore, the biasing force in the axial direction which is applied on the cam member 85 from the lifter member 81 by the damper spring 83 is supported at least by the drive bevel gear 41 and further by the second flange portion 63c. The cam member 85 is also directly supported by the second flange portion 63c.

Since the second flange portion 63c is supported on the extended shaft 6 via the inner race 75a of the first ball bearing 75, the retainer plate member 64 and the fastening bolt 65, the collar member 63 can fix the position in the axial direction of the cam member 85.

On the other hand, the right end side of 83a of the damper spring 83 is supported by the first flange portion 82 of the extended shaft 6. Accordingly, the cam damper mechanism 8 is provided in a completed form over the extended shaft 6, which thereby can fix the compression amount of the damper spring 83 only with the assembly on the extended shaft 6 side.

Incidentally, the side of the drive bevel gear 41 and the cam member 85, which confronts the second flange portion 63c of the collar member 63, is configured such that portions thereof constitute contact surfaces 41c, 85c abutting on the second flange portion 63c, respectively. The other portions thereof have gaps 41d, 85d therebetween and the second flange portion 63c. By setting portions on the side, which confronts the second flange portion 63c of the collar member 63, as the contact surfaces 41c, 85c, the area of the contact surfaces 41c, 85c is reduced and the lubricating oil is held in the gaps 41c, 85c of the other portions thereof, which thereby reduce the frictional resistance during a phase shifting rotation against the extended shaft 6 of the cam member 85 as a result of the operation of the cam damper mechanism 8.

Although the function of the above-described cam damper mechanism 8 is conventionally known, it will be briefly described hereinafter in FIGS. 4 and 5 as frame formats.

According to the embodiment of the present invention, the lifter member 81 is moved to the axial direction by the biasing force of the damper spring 83 and applies an axial direction force Fa and a rotation directional force Fr on the (pressure-weld) cam member 85. This will be described, however, showing the reaction force, which the cam member 85 applies on the lifter member 81, for convenience sake of illustration.

Figure 4:
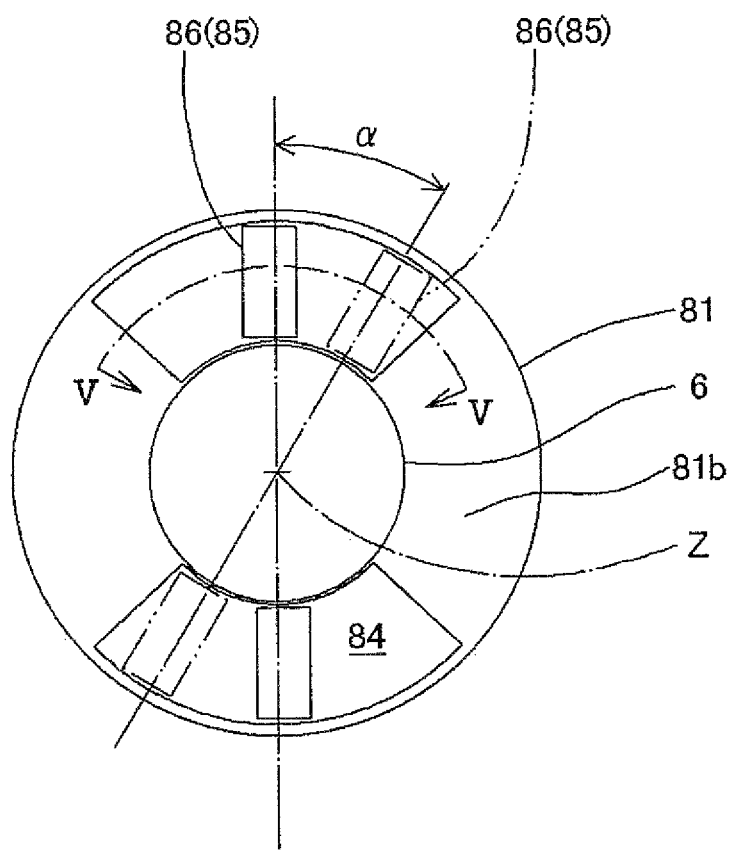
FIG. 4 is a frame format of a cam damper mechanism corresponding to a line shown by an arrow IV-IV in FIG. 3.
Figure 5:
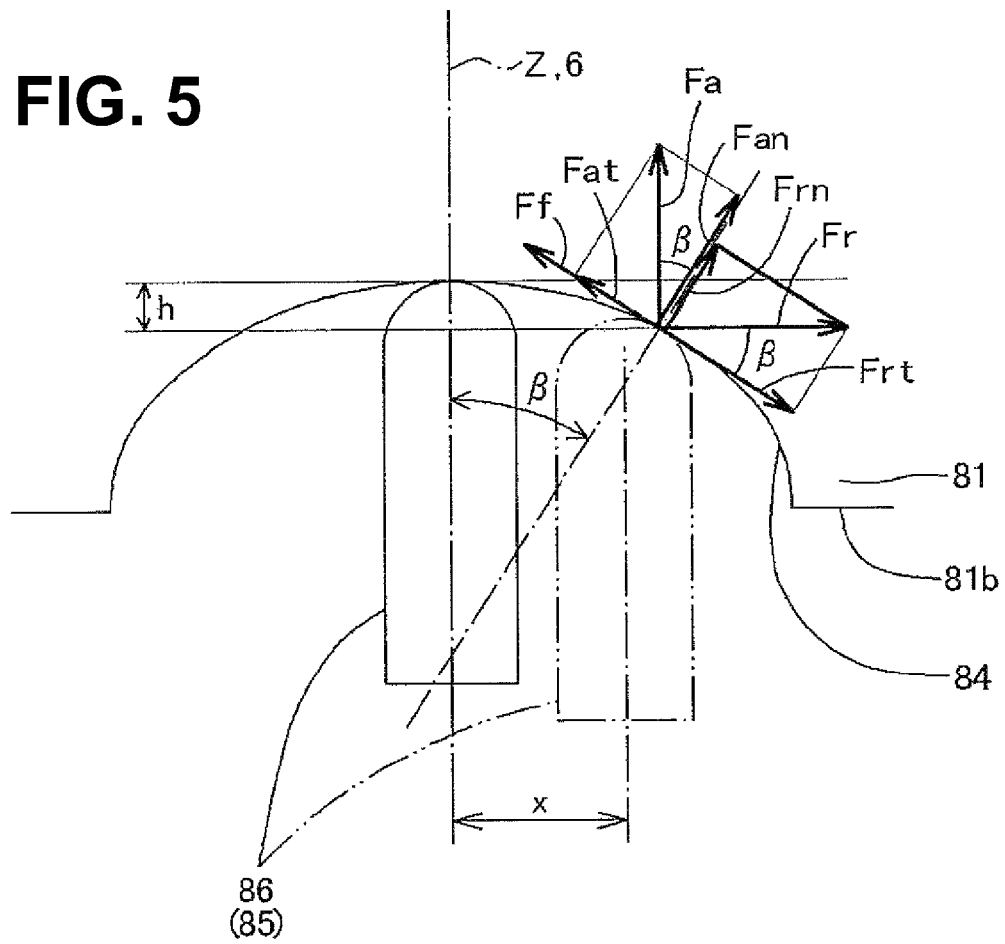
FIG. 5 is a frame format of a cam damper mechanism corresponding to a line shown by an arrow V-V in FIG. 4.

As shown in FIGS. 4 and 5, the concave cam surface 84, which forms a concave portion in the axial direction along the circumferential direction, is formed on a left side surface 81b of the lifter member 81 and abuts on the convex cam portion 86 of the cam member 85 which is mounted on the left side on the extended shaft 6.

As shown in FIG. 5, when the rotation directional force Fr to be transferred is stronger at its contact point between the concave cam surface 84 and the convex cam portion 86 than the frictional force Ff of the tangent direction, for example, at the time of rapid torque fluctuation, the convex cam portion 86 slides on the concave cam surface 84 by a degree (is deviated by X relative to the concave cam surface 84) around the axis of the output shaft (countershaft) Z, and contacts the concave cam surface at the position in which the convex cam portion rotates by $\beta$ degree relative to the concave cam surface 84. As a rotation of the convex cam portion by $\beta$ degree, the damper spring 83 generates an axial force Fa due to a deviation h in the axial direction and the preload of the initial compression.

Then, when a tangential component force Frt of the rotation directional force Fr comes into balance with the sum of a tangential component force Fat, which is caused by the axial force Fa of the biasing force of the damper spring 83, and the frictional force Ff, the convex cam portion stops sliding and transfers the rotation.

Incidentally, the frictional force Ff depends on a normal directional component force Frn of the rotation directional force Fr, a normal directional component force Fan of the axial force Fa and the like.

When the rotation directional force Fr is reduced, the deviation is reduced until it comes into balance, and a damping function is achieved.

As shown in FIG. 3, the left end portion 32b side of the countershaft 32 as the output shaft is pivotally supported on the unit case 10 via the second ball bearings 74, and the extended shaft 6 is spline-connected with the output shaft 32. Further, the right end portion (output shaft side portion) 6a of the extended shaft 6 is provided while having a clearance c3 with the second bearings 74.

The extended shaft 6 is rotatably provided integrally with the output shaft 32 by being spline-connected with the output shaft 32, and is supported one-sidedly relative to the axial force on the bevel gear holder 45 side via the first ball bearings 75. As a result, it is possible to prevent the extra axial force from applying on the cam damper mechanism 8, which is disposed over the extended shaft 6, and to prevent the interference with the damper function.

Furthermore, the second ball bearings 74 are accommodated so as to be held by a bearing holding boss 10b formed in the unit case 10. The bearing holding boss 10b has a protruding ring portion 10c which protrudes on the extended shaft 6 side. A needle bearing or roller bearing (the third bearing of the present invention) 76 is interposed between the right end portion 6a of the extended shaft 6 and the protruding ring portion 10c.

A clearance c4 in the axial direction is provided between the first flange portion 82 and the protruding ring portion 10c. Therefore, it is possible to pivotally and radially support the extended shaft 6 more securely without applying the axial force on the extended shaft 6.

As shown in FIG. 3, the countershaft 32 has an output shaft hollow portion 32c formed therein. The lubricating oil, which is fed from an oil pump (not shown) for lubricating the transmission device 3, passes through the output shaft hollow portion 32c of the counter shaft.

An extended shaft hollow portion 6c, which communicates with the output shaft hollow portion 32c, is provided in the extended shaft 6. The extended shaft hollow portion 6c is configured such that the lubricating oil on the output shaft hollow portion 32c side can circulate in the extended shaft hollow portion 6c.

An oil passing hole 6d, which is provided from the extended shaft hollow portion 6c toward the inner circumferential surface of the lifter member 81 of the cam damper mechanism 8, and an oil passing hole 6e, which is opened toward the inner circumferential surface of the cam member 85 via an oil passing hole 63d opened in the collar member 63, are opened in the extended shaft 6. The oil passing hole 6d and the oil passing hole 6e are configured so as to be capable of easily flowing the lubricating oil around the cam damper mechanism 8 and a pair of the bevel gears 41, 42.

As described above, the extended shaft 6 includes the drive bevel gear 41 and the cam damper mechanism 8 arranged between the first flange portion 82 of the right end portion 6a of the extended shaft and the first ball bearings 75 fastened to the left end portion 6b, and is accommodated in the bevel gear case 40 in such a state as to be fixed to the bevel gear holder 45 along with the first ball bearings 75.

The bevel gear holder 45 has a hole portion 46 formed therein. The first ball bearings 75 are fixed in the hole portion 46. In the hole portion 46, there are provided a projection portion 46a, which protrudes inward in the diameter direction on the output shaft 32 side, and a female screw portion 46b of the hole portion 46, which is disposed on the shaft end side of the extended shaft 6. The first ball bearings 75 are seated on the projection portion 46a, and are fixed with a lock nut 47 which is screwed in the female screw portion 46b at the same time. With such a simple configuration, the first ball bearings 75 are fixed inside the bevel gear holder 45.

As shown in FIG. 3, the bevel gear holder 45 has a cap 44.

Therefore, the cam damper mechanism 8 is provided in a completed form on the extended shaft 6 by providing the first flange portion 82 on the right end portion 6a of the extended shaft 6 and fastening the first ball bearings 75 to the left end portion 6b of the extended shaft 6, which thereby can fix the compression amount of the damper spring 83 only with the assembly on the extended shaft 6 side.

When the cam damper mechanism 8 is assembled, as described above, and the extended shaft 6 on which the first ball bearings 75 are fixed to the bevel gear holder 45 along with the first ball bearings 75, the driven bevel gear 42 is formed integrally with the connecting shaft 43 and is pivotally supported in the bevel gear case 40 via ball bearings 77. Therefore, a shim 49 may be interposed at a joint face 48 between the bevel gear holder 45 and the bevel gear case 40, and be adjusted in order to adjust the mesh amount of a pair of the bevel gears 41, 42.

However, in case of the embodiment of the present invention, in the cam damper mechanism 8, the compression amount of the damper spring 83 is fixed only with the assembly on the extended shaft 6 side. Accordingly, the shim can be independently adjusted without having an effect on the compression amount of the damper spring 83 by interposing the shim 49 at the joint face 48 between the bevel gear holder 45 and the bevel gear case 40.

Therefore, it is possible both to keep the uniform preloading of the damper spring 83 and to facilitate the adjustment of the mesh amount of a pair of the bevel gears 41, 42, also when attaching the bevel gear holder 45 to the bevel gear case 40.

Having thus described the specific embodiment of the present invention, the present invention is not limited to the above-described preferred embodiment, but various changes in a preferred embodiment may be made without departing from the scope of claims.

For example, a shaft drive type internal combustion engine may be any shaft drive type internal combustion engine having the configuration according the first aspect, may also be what is reversed in the left and right arrangement, and is not limited to a V-type four-cylinder engine. Further, small vehicles are not limited to the motorcycle according to the embodiment of the present invention, but include three-wheel and four-wheel small vehicles such as all-terrain vehicles.

Furthermore, the type of a bearing of the embodiment of the present invention is not limited to ball bearings, roller bearings, needle bearings and the like in the embodiment, but may be changed to appropriate bearings including metal bearings.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. In a power unit of a shaft drive type vehicle, the power unit comprising
   an unit case;
   an output shaft having a shaft end portion protruding from the unit case;
   an extended shaft disposed on the shaft end portion of the output shaft, and operable to integrally rotate with the output shaft;
   a bevel gear case which accommodates the extended shaft;
   a bevel gear holder which supports an end portion of the extended shaft;
   a pair of bevel gears, which convert the axial direction of the extended shaft; and
   said extended shaft having a cam damper mechanism comprising
      a cam member,
      a lifter member, which cooperates with the cam member, and
      a damper spring which pressure-welds the lifter member and said cam member; the improvement comprising:
      said cam member of said cam damper mechanism reciprocally unrotatably provided on one of the bevel gears, and rotatably provided on said extended shaft; and
      said lifter member slidably provided on said extended shaft in the axial direction and in an unrotatable manner;
      said damper spring being configured such that one end thereof is supported on the first flange portion, which is projected on an output shaft side portion of said extended shaft, and the other end thereof biases the lifter member toward said cam member in the axial direction by abutting on said lifter member, and the biasing force applied on the cam member in the axial direction is supported by at least one of the bevel gears;

said extended shaft having a first flange portion projected on an output shaft side portion of said extended shaft, and a first bearing fastened to the other end portion of the extended shaft;
wherein said extended shaft has said one of the bevel gears and said cam damper mechanism arranged between said first flange portion and the first bearing, and is configured so as to be accommodated in said bevel gear case in such a state that the extended shaft is fixed to said bevel gear holder along with said first bearing.

2. A power unit of the shaft drive type vehicle according to claim 1, further comprising
a retainer plate member arranged at said end portion of the extended shaft; and
a collar member formed separately from the extended shaft and fitted on said extended shaft;
the collar member comprising
a first cylindrical portion on which said one of the bevel gears is rotatably supported, and
a second flange portion extending outwardly in a diameter direction so as to be sandwiched between said one of the bevel gears and said first bearing;
wherein:
said extended shaft is provided with a stepped portion on which the end portion of the first cylindrical portion of said collar member is abutted;
said first bearing is fastened to said extended shaft by a fastening member such that an inner race thereof is sandwiched between the retainer plate member and said collar member.

3. A power unit of the shaft drive type vehicle according to claim 2, wherein
a side of said one of the bevel gears and the cam member, which confronts the second flange portion of said collar member, is configured such that a portion thereof constitutes contact surfaces abutting on the second flange portion and the other portion thereof has gaps formed therebetween and the second flange portion.

4. A power unit of the shaft drive type vehicle according to claim 2, further comprising a second cylindrical portion formed in said collar member, wherein said second cylindrical portion extends after being fitted in the inner circumference of the inner race of said first bearing.

5. A power unit of the shaft drive type vehicle, according to claim 3, further comprising a second cylindrical portion formed in said collar member, wherein said second cylindrical portion extends after being fitted in the inner circumference of the inner race of said first bearing.

6. A power unit of the shaft drive type vehicle according to claim 4, wherein clearances are provided between said other end portion of said extended shaft, the end portion of the second cylindrical portion of said collar member and said retainer plate member.

7. A power unit of the shaft drive type vehicle according to claim 1, wherein:
said bevel gear holder has a hole portion formed therein to which said first bearing is fixed;
the hole portion is provided with a projection portion, which protrudes in an inside diameter direction on said output shaft side of the hole portion, and a female screw portion which is disposed on the axial end side of the extended shaft of the hole portion; and
said first bearing is seated on said projection portion and is fixed with a lock nut which is screwed in said female screw portion.

8. A power unit of the shaft drive type vehicle according to claim 1, further comprising a second bearing, wherein:
said shaft end portion of said output shaft is pivotally supported via the second bearing after penetrating said unit case;
said extended shaft is spline-connected with said output shaft; and
said output shaft side portion of the extended shaft is disposed so as to provide a clearance between the extended shaft and said second bearing.

9. A power unit of the shaft drive type vehicle according to claim 8, further comprising a third bearing, wherein:
said second bearing is accommodated in a bearing holding boss of said unit case so as to be held thereby;
the bearing holding boss has a protruding ring portion which protrudes on said extended shaft side;
said third bearing is interposed between the protruding ring portion and the output shaft side portion of said extended shaft;
a clearance is provided in the axial direction between said first flange portion and said protruding ring portion.

10. A power unit of the shaft drive type vehicle according to claim 8, wherein:
said output shaft is provided with an output shaft hollow portion which allows passing of lubricating oil inside the output shaft hollow portion; and
said extended shaft is further provided with an extended shaft hollow portion, which communicates with the output shaft hollow portion, and is configured such that the lubricating oil in the output shaft hollow portion side circulates in the extended shaft hollow portion.

11. A power unit comprising
an output shaft having a shaft end portion;
an extended shaft disposed on the output shaft, and operable to integrally rotate with the output shaft;
a bevel gear case which accommodates the extended shaft;
a bevel gear holder which supports the extended shaft;
a shim interposed at a joint between the bevel gear holder and the bevel gear case;
a drive shaft system;
a pair of bevel gears connecting the extended shaft with said drive shaft system; and
a cam damper mechanism comprising
a cam member,
a lifter member, which cooperates with the cam member, and
a damper spring arranged between lift member and said extended shaft so as to pressure-weld the lifter member and said cam member;
wherein:
said cam member is provided on one of the bevel gears, and on said extended shaft;
said lifter member is arranged on said extended shaft in an axial direction;
said damper spring is configured such that one end side thereof is supported on said first flange portion and the other end side thereof biases the lifter member toward said cam member in the axial direction, and the biasing force applied on the cam member in the axial direction is supported by at least one of the bevel gears;
said extended shaft includes a first flange portion projected on one end portion thereof, and a first bearing fastened to the other end portion of the extended shaft; and
said one of the bevel gears and said cam damper mechanism arranged between said first flange portion and the first bearing.

12. A power unit according to claim 11, further comprising
a retainer plate member; and
a collar member fitted on said extended shaft;

the collar member comprising
a first cylindrical portion on which said one of the bevel gears is supported, and
a second flange portion sandwiched between said one of the bevel gears and said first bearing;
wherein:
said extended shaft is provided with a stepped portion on which the end portion of the first cylindrical portion of said collar member is abutted;
said first bearing is fastened to said extended shaft by a fastening member with an inner race thereof sandwiched between the retainer plate member and said collar member.

13. A power unit according to claim 12, wherein
a side of said one of the bevel gear and the cam member, which confronts the second flange portion of said collar member, is configured such that a portion thereof constitutes contact surfaces abutting on the second flange portion and the other portion thereof has gaps formed therebetween and the second flange portion.

14. A power unit according to claim 11, wherein:
said bevel gear holder has a hole portion formed therein;
the hole portion is provided with a projection portion, and a female screw portion;
said first bearing is seated on said projection portion and is fixed with a lock nut which is screwed in said female screw portion.

15. A power unit according to claim 11, further comprising a second bearing, wherein:
said shaft end portion of said output shaft is pivotally supported via the second bearing;
said extended shaft is spline-connected with said output shaft; and
said one end portion of the extended shaft is arranged such that a clearance is provided between the extended shaft and said second bearing.

16. A power unit for a vehicle, comprising
an output shaft;
an extended shaft disposed on the output shaft;
a first flange portion formed on the extended shaft;
a bevel gear case configured to accommodate a portion of the extended shaft;
a bevel gear holder which supports the extended shaft;
a pair of bevel gears; and
a cam damper mechanism comprising
a cam member,
an annular lifter member, and
a damper spring arranged between the lifter member and said extended shaft;
wherein:
said cam member is provided on one of the bevel gears and on said extended shaft; and
said damper spring is configured such that one end side thereof is supported on said first flange portion and the other end side thereof biases the lifter member toward said cam member, and the biasing force applied on the cam member in the axial direction is supported by at least one of the bevel gears.

17. A power unit according to claim 16, further comprising
a first bearing;
a retainer plate member arranged at said end portion of the extended shaft; and
a collar member fitted on said extended shaft;
said collar member comprising:
a first cylindrical portion on which said one of the bevel gears is relatively rotatably supported, and
a second flange portion sandwiched between said one of the bevel gears and said first bearing;
wherein:
said extended shaft is provided with a stepped portion on which the end portion of the first cylindrical portion of said collar member is abutted; and
said first bearing is fastened to said extended shaft by a fastening member with an inner race thereof sandwiched between the retainer plate member and said collar member.

18. A power unit according to claim 17, wherein
a side of said one of the bevel gear and the cam member, which confronts the second flange portion of said collar member, is configured such that a portion thereof constitutes contact surfaces abutting on the second flange portion and the other portion thereof has gaps therebetween and the second flange portion.

19. A power unit according to claim 16, further comprising a first bearing; wherein:
said bevel gear holder has a hole portion formed therein;
the hole portion is provided with a projection portion and a female screw portion; and
said first bearing is seated on said projection portion and is fixed with a lock nut which is screwed in said female screw portion.

20. A power unit according to claim 16, further comprising a second bearing, wherein:
said shaft end portion of said output shaft is pivotally supported via the second bearing;
said extended shaft is spline-connected with said output shaft; and
said output shaft side portion of the extended shaft is arranged such that a clearance is provided between said extended shaft and said second bearing.

* * * * *